United States Patent
Chai et al.

(10) Patent No.: US 12,296,915 B2
(45) Date of Patent: May 13, 2025

(54) FOOTBOARD ANTI-SKID PAD ASSEMBLY AND SCOOTER

(71) Applicant: NINEBOT (BEIJING) TECH CO., LTD., Beijing (CN)

(72) Inventors: Fuhua Chai, Beijing (CN); Anxin Shi, Beijing (CN); Zhilei Ding, Beijing (CN)

(73) Assignee: NINEBOT (BEIJING) TECH CO., LTD. (CN)

( * ) Notice: Subject to any disclaimer, the term of this patent is extended or adjusted under 35 U.S.C. 154(b) by 734 days.

(21) Appl. No.: 17/581,237

(22) Filed: Jan. 21, 2022

(65) Prior Publication Data
US 2022/0234678 A1 Jul. 28, 2022

(51) Int. Cl.
*B62K 23/08* (2006.01)
*H01H 13/702* (2006.01)

(52) U.S. Cl.
CPC .......... *B62K 23/08* (2013.01); *H01H 13/702* (2013.01)

(58) Field of Classification Search
CPC .............................. B62K 23/08; H01H 13/702
See application file for complete search history.

(56) References Cited

U.S. PATENT DOCUMENTS

| | | | |
|---|---|---|---|
| 5,396,970 A * | 3/1995 | Ono | B60L 58/21 180/220 |
| 5,622,759 A * | 4/1997 | Fuster | A63C 17/262 428/323 |
| 7,053,288 B2 * | 5/2006 | Iwai | G10H 1/32 455/344 |
| 7,058,998 B2 * | 6/2006 | Diller | A61G 13/02 5/616 |
| 7,090,040 B2 * | 8/2006 | Kamen | B60K 31/00 180/7.1 |
| 7,363,993 B2 * | 4/2008 | Ishii | B62D 61/00 180/218 |
| 7,931,573 B2 * | 4/2011 | Shinomiya | A63B 21/00178 482/142 |
| 8,662,508 B2 * | 3/2014 | Grossman | A63C 17/26 280/87.041 |
| 10,160,503 B1 * | 12/2018 | Zheng | A63C 17/015 |
| 10,252,724 B2 * | 4/2019 | Edney | B62K 11/007 |
| 10,736,799 B1 * | 8/2020 | Dickie | A61G 5/047 |
| 10,745,075 B2 * | 8/2020 | Kama | B62K 15/006 |
| 10,780,928 B2 * | 9/2020 | Pang | A63C 17/015 |
| 11,103,394 B1 * | 8/2021 | Dickie | A61G 5/1089 |

(Continued)

*Primary Examiner* — Valentin Neacsu
*Assistant Examiner* — Michael R Stabley
(74) *Attorney, Agent, or Firm* — Emerson, Thomson & Bennett, LLC; Roger D. Emerson; Matt J. Wilson

(57) ABSTRACT

Embodiments of the present disclosure provide a pedal anti-skid pad assembly and a scooter. The pedal anti-skid pad assembly is configured to be install on a pedaling portion of a scooter. The pedal anti-skid pad assembly includes an anti-skid pad body and a membrane switch. The anti-skid pad body has a first surface for being fixedly connected with the pedaling portion. The membrane switch is fixed on the first surface of the anti-skid pad body. The membrane switch is configured to electrically connect with an electric drive apparatus of the scooter, and the membrane switch is configured to switch on when receiving external force to trigger the electric drive apparatus to start.

17 Claims, 2 Drawing Sheets

(56) References Cited

U.S. PATENT DOCUMENTS

| | | | |
|---|---|---|---|
| 11,648,458 B2* | 5/2023 | Rogers | B60L 50/51 |
| | | | 180/181 |
| 11,684,843 B2* | 6/2023 | Choi | B62K 11/00 |
| | | | 180/181 |
| 2004/0055796 A1* | 3/2004 | Kamen | B60K 26/02 |
| | | | 180/218 |
| 2011/0031711 A1* | 2/2011 | Grossman | B62J 6/16 |
| | | | 280/87.041 |
| 2019/0250615 A1* | 8/2019 | Gillett | A63C 17/12 |
| 2020/0070933 A1* | 3/2020 | Chen | B62M 6/50 |
| 2020/0238159 A1* | 7/2020 | Choi | A63C 17/12 |

* cited by examiner

FOOTBOARD ANTI-SKID PAD ASSEMBLY AND SCOOTER

CROSS-REFERENCE TO RELATED APPLICATIONS

The present disclosure claims priority to Chinese Patent Application No. 202120204886.7, filed with the Chinese patent Office on Jan. 25, 2021 and entitled "FOOTBOARD ANTI-SKID PAD ASSEMBLY FOR VEHICLE AND SCOOTER", the entire contents of which are incorporated herein by reference.

TECHNICAL FIELD

The present disclosure relates to the technical field of transportation, in particular to a footboard anti-skid pad assembly and a scooter.

BACKGROUND

Scooter is a commonly-used short-distance transport that we see in our lives. It may travel at a speed of 5-20 kilometers per hour. The scooter mainly consists of a handle tube, a riser tube, a front wheel, a footboard and a rear wheel. After years of development, it has a variety of functions. In order to be safe and convenient to use, a power button of the scooter needs to be designed, and the scooter can only be ridden when the power button is triggered.

SUMMARY

In view of the above problem, the present disclosure proposes a footboard anti-skid pad assembly and a scooter, to solve the above problem or at least partially solve the above problem.

An embodiment of a first aspect of the present disclosure provides a footboard anti-skid pad assembly configured for being installed on a footboard portion of a scooter. The footboard anti-skid pad assembly includes: an anti-skid pad body, the anti-skid pad body having a first surface for being fixedly connected with the footboard portion; and a membrane switch, fixed on the first surface of the anti-skid pad body, the membrane switch being configured to electrically connect with an electric drive apparatus of the scooter, and the membrane switch being configured to switch on when receiving external force to trigger the electric drive apparatus to start.

An embodiment of a first aspect of the present disclosure provides a scooter, comprising a footboard portion, a drive wheel provided under the footboard portion, and a footboard anti-skid pad assembly configured for being installed on the footboard portion. The footboard anti-skid pad assembly comprises: an anti-skid pad body, the anti-skid pad body having a first surface for being fixedly connected with the footboard portion; and a membrane switch, fixed on the first surface of the anti-skid pad body, the membrane switch being configured to electrically connect with an electric drive apparatus of the scooter, and the membrane switch being configured to switch on when receiving external force to trigger the electric drive apparatus to start.

According to the footboard anti-skid pad assembly and the scooter provided by the embodiments of the present disclosure, the membrane switch is provided on the anti-skid pad body of the footboard portion of the scooter. After the anti-skid pad body is installed on the footboard portion, when a user stands on the anti-skid pad body, force may be transmitted to the membrane switch to switch on the membrane switch, and then the electric drive apparatus of the scooter can be started, which realizes the function of triggering the start of the scooter by standing on the scooter, and the operation is convenient and fast, the scooter can be started without user's additional active force. Therefore, the operation convenience of the scooter can be improved, and user experience can be improved.

BRIEF DESCRIPTION OF THE DRAWINGS

In order to describe the technical solution in embodiments of the present disclosure or in the prior art more clearly, the following will briefly introduce the accompanying drawings that need to be used in the description of the embodiments or the prior art. Obviously, the accompanying drawings in the following description are some embodiments of the present disclosure. For those of ordinary skill in the art, other accompanying drawings may be obtained based on these accompanying drawings without creative work.

DETAILED DESCRIPTION OF EMBODIMENTS

In related arts, the power button of an electric scooter is usually set at the handle and designed as a dip switch, a brake lever, etc. This method requires a user to manually operate the switch and actively apply force to operate, which is not convenient to use.

The technical solution in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by those skilled in the art without creative work shall fall within the protection scope of the present disclosure.

The "including" mentioned in the entire specification and claims is an open term, so it should be interpreted as "including but not limited to". "Approximately" means that within an acceptable error range, those skilled in the art can solve the technical problem within a certain error range, and basically achieve the technical effect.

In addition, the term "connection" herein includes any direct and indirect means of connection. Therefore, if it is described in the text that a first apparatus is connected to a second apparatus, it represents that the first apparatus may be directly connected to the second apparatus, or indirectly connected to the second apparatus through other apparatuses. The following description of the specification is a preferred embodiment for implementing the present disclosure. However, the description is for the purpose of illustrating the general principles of the present disclosure, and is not intended to limit the scope of the present disclosure.

The protection scope of the present disclosure shall be subject to those defined by the appended claims.

It should be understood that the term "and/or" used herein is only an association relationship describing associated objects, which means that there may be three types of relationships. For example, A and/or B may represent: A alone exists, A and B exist at the same time, and B exists alone. In addition, the character "/" in this text generally indicates that the associated objects before and after are in an "or" relationship.

Figure 1:
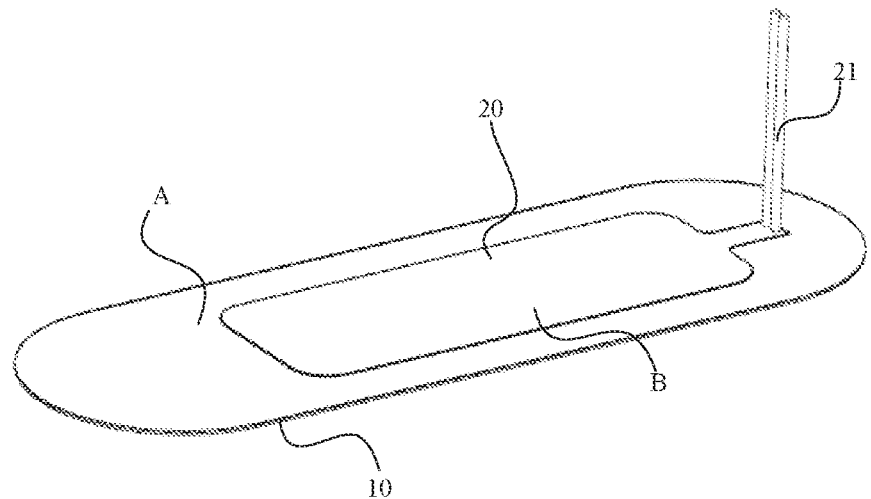
FIG. 1 is a schematic structural diagram of a footboard anti-skid pad assembly provided by an embodiment of the present disclosure.
Figure 2:
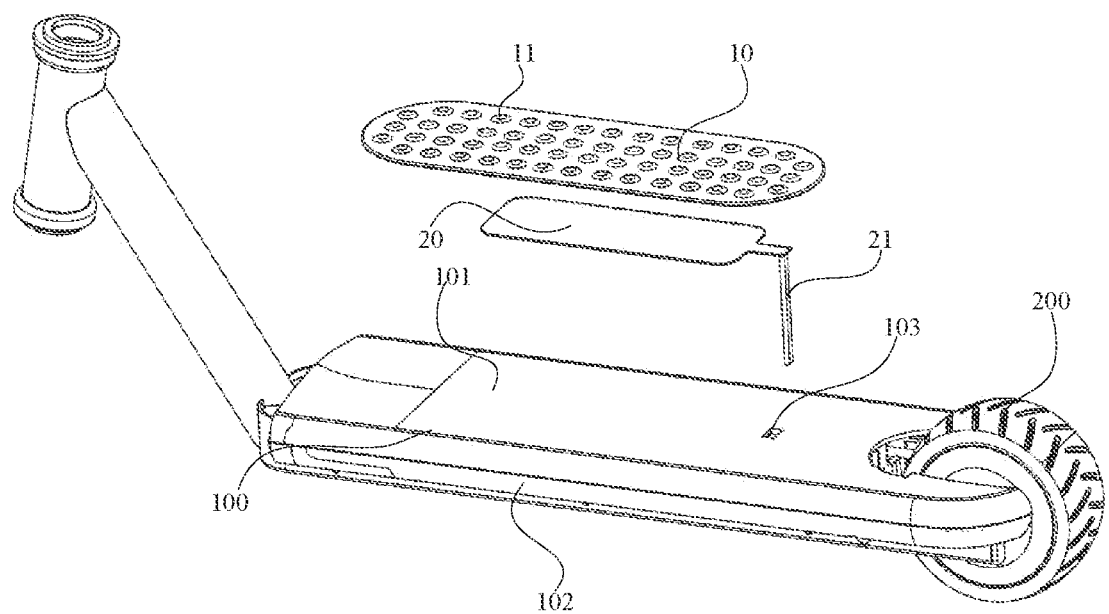
FIG. 2 is a cross-sectional view of a footboard anti-skid pad assembly provided by an embodiment of the present disclosure.
Figure 3:
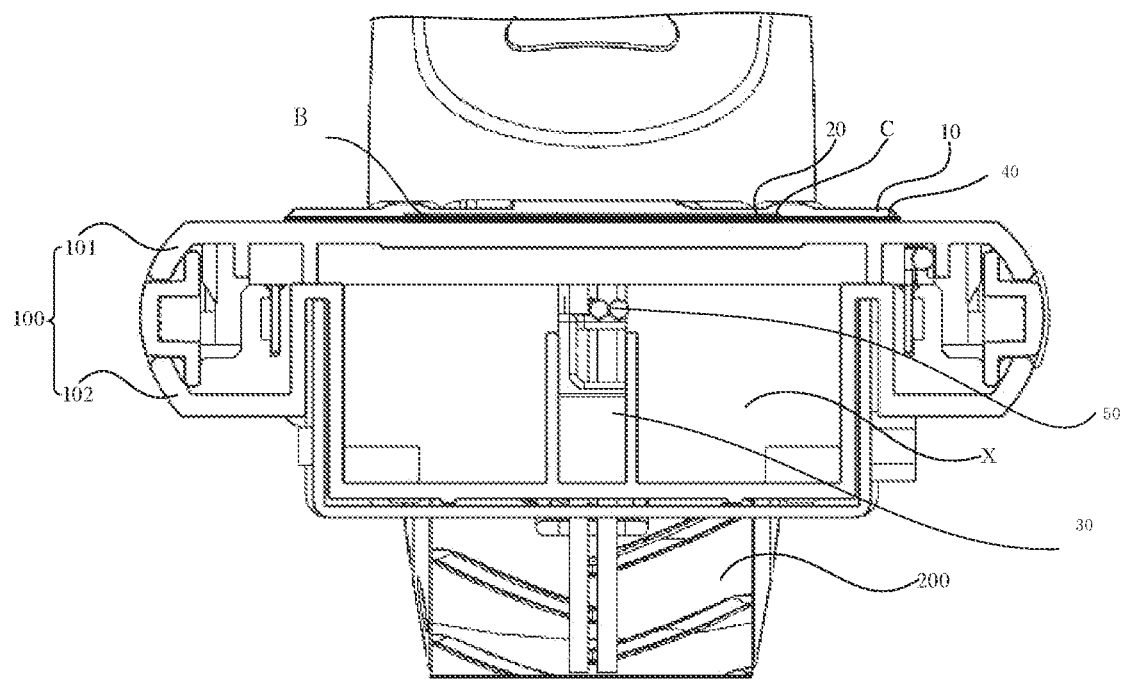
FIG. 3 is a schematic diagram of a partial exploded structure of a scooter provided by an embodiment of the present disclosure.
Figure 4:
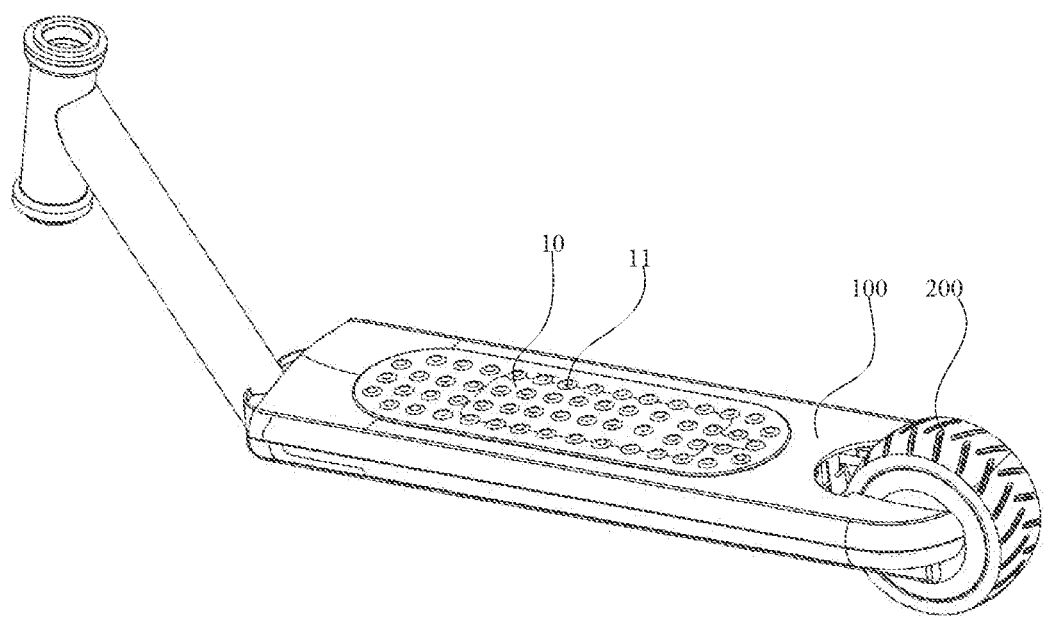
FIG. 4 is a schematic diagram of a footboard anti-skid pad assembly after installation provided by an embodiment of the present disclosure.

FIG. 1 is a schematic structural diagram of a footboard anti-skid pad assembly provided by an embodiment of the present disclosure; FIG. 2 is a cross-sectional view of a footboard anti-skid pad assembly provided by an embodiment of the present disclosure; FIG. 3 is a schematic diagram of a partial exploded structure of a scooter provided by an embodiment of the present disclosure; and FIG. 4 is a schematic diagram of a footboard anti-skid pad assembly after installation provided by an embodiment of the present disclosure. Referring to FIG. 1 to FIG. 4, the footboard anti-skid pad assembly provided by the embodiments of the present disclosure is configured for being installed on a footboard portion 100 of the scooter. Both ends of the footboard portion 100 are connected to a front wheel (not shown in the figure) and a rear wheel 200 respectively.

In some embodiments, the rear wheel 200 may be a drive wheel, and the front wheel may be a driven wheel. In some other embodiments, the front wheel may be the drive wheel, and the rear wheel 200 may be the driven wheel. The footboard portion 100 may include an upper shell 101 and a lower shell 102 that are detachably connected. The upper shell 101 and the lower shell 102 may be detachably connected by fasteners such as screws. The upper shell 101 and the lower shell 102 may form a receiving space after being fastened. The receiving space may receive an electronic control element 50, so as to realize the control and switching of a sliding mode of the scooter. The upper shell 101 and the lower shell 102 are detachably connected together, so that the receiving space can be easily exposed, and the electronic control element 50 inside may be repaired or replaced.

As shown in FIG. 1, the footboard anti-skid pad assembly provided by the present embodiment includes: an anti-skid pad body 10 and a membrane switch 20. The anti-skid pad body 10 has a first surface A for being fixedly connected with the footboard portion 100. The membrane switch 20 is fixed on the first surface A of the anti-skid pad body 10, the membrane switch 20 is configured to electrically connect with an electric drive apparatus 30 of the scooter, and the membrane switch 20 is configured to switch on when receiving external force to trigger the electric drive apparatus 30 to start.

Specifically, the anti-skid pad body 10 is usually made of silica gel, which has a soft texture and a good anti-skid effect. In addition, the manufacturing cost of silica gel is relatively low, and the cost of one-piece injection molding is sufficient. A surface of the anti-skid pad body 10 facing away from the footboard portion 100 may have anti-skid protrusions 11, and a shape of the anti-skid protrusions 11 may be any shape such as convex column, corrugated, or irregular pattern. By providing the anti-skid protrusions 11, an anti-skid effect of the anti-skid pad body 10 can be effectively improved. The membrane switch 20 is an operating system that integrates key functions, indicator elements, and instrument panels. The membrane switch 20 is mainly composed of four parts: a panel, an upper circuit, an isolation layer, and a lower circuit. When the membrane switch 20 is pressed, for example, the membrane switch 20 receives a pedaling force of a user and is pressed, contacts of the upper circuit may be deformed downwards and contact with a pole plate of the lower circuit such that the membrane switch 20 switches on. Since the membrane switch 20 is fixed on the first surface A of the anti-skid pad body 10, when the user stands on the anti-skid pad body 10 of the scooter, pressure applied by the user on the anti-skid pad body 10 is transmitted to the membrane switch 20, so that the membrane switch 20 can switch on.

The membrane switch 20 being electrically connected to the electric drive apparatus includes that the membrane switch 20 being directly electrically connected to the electric drive apparatus, and may also include that the membrane switch 20 being indirectly electrically connected to the electric drive apparatus. When the membrane switch 20 is pressed and switched on, the electric drive apparatus receives the conduction signal, and may start the drive wheel to rotate, so that the entire scooter can travel.

In some embodiments, the membrane switch 20 can have a mode switching function. For example, the user double-clicks a position on the anti-skid pad body 10 corresponding to the membrane switch 20 to select a traveling speed of the scooter so that the scooter is in a high-speed mode, a medium-speed mode, or a low-speed mode.

In some embodiments, a program may be preset, so that when the user gets off the footboard portion 100 and the pressure on the membrane switch 20 disappears, a preset time (for example, 2 minutes) passes before the scooter turns off. In the preset time period, the user may push the scooter to walk around. After the preset time, the drive wheel of the scooter cannot rotate, and the user cannot push the scooter. In this regard, the scooter is equivalent to being in a locked state, thereby improving the safety of use of the scooter.

It should be noted that, in the present embodiment, preferably, the anti-skid pad body 10 may protrude from the footboard portion 100 when the anti-skid pad body 10 is fixed on the footboard portion 100. Since the anti-skid pad body 10 protrudes from the footboard portion 100, a deformation space of the anti-skid pad body 10 is not limited in a height direction, so that the anti-skid and shock absorption effects of the anti-skid pad body 10 can be ensured. In some other embodiments, the footboard portion 100 may have a groove for receiving the anti-skid pad body 10, and the anti-skid pad body 10 may be fixed in the groove of the footboard portion 100. The groove may provide installation positioning of the anti-skid pad body 10, so that the anti-skid pad body 10 can be accurately fixed at a preset position, which improves the reliability and accuracy of product installation. Furthermore, when the anti-skid pad body 10 is fixed on the footboard portion 100, the anti-skid pad body 10 may be flush with an upper surface of the footboard portion 100 to improve the aesthetics of appearance and improve the fixing reliability of the anti-skid pad body 10.

On the other hand, in the embodiment shown in FIG. 1, the anti-skid pad body 10 is oblong, the corresponding membrane switch 20 is rectangular, and an extending direction of a long side of the anti-skid pad body 10 is consistent with an extending direction of a long side of the membrane switch 20, and all extend along a front and rear direction of the scooter. Since the shape of the membrane switch 20 is rectangular, in some other embodiments, the anti-skid pad body 10 may be rectangular, circular, oval, square, or the like. The membrane switch 20 may also have any shape such as a square, a circle, an oval, a diamond, which is not limited in the present disclosure.

According to the footboard anti-skid pad assembly and the scooter provided by the embodiments of the present disclosure, the membrane switch is provided on the anti-skid pad body of the footboard portion of the scooter. After the anti-skid pad body is installed on the footboard portion, a user pedals on the anti-skid pad body, that is, force may be transmitted to the membrane switch to switch on the membrane switch, and then the electric drive apparatus of the scooter can be started, which realizes the function of triggering the start of the scooter by standing on the scooter, and the operation is convenient and fast, the scooter can be started without user's additional active force. Therefore, the operation convenience of the scooter can be improved, and user experience can be improved. Moreover, since the function may be realized by only adding one membrane switch, the operation is simple, the cost is low, and it is stable and reliable.

In addition, since the membrane switch 20 is provided on the first surface A of the anti-skid pad body 10, the first surface A is used to be fixedly connected to the footboard portion 100. Therefore, the anti-skid pad body 10 covers the membrane switch 20 and has a certain protective effect on the membrane switch 20. On the other hand, since the anti-skid pad body 10 is generally made of soft materials such as silicone material, force exerted on the anti-skid pad body 10 is easily transmitted to the membrane switch 20, making the membrane switch 20 sensitive. As long as the user stands on the anti-skid pad body 10, the membrane switch 20 is quickly and sensitively switched on.

Based on the above embodiment, the anti-skid pad body may be configured to bond to the footboard portion 100 through an adhesive layer 40. Since the anti-skid pad body 10 is generally made of a soft silicone material, bonding the anti-skid pad body 10 to the footboard portion 100 may ensure that a connection force of the anti-skid pad body 10 is balanced everywhere, and the anti-skid pad body 10 is guaranteed to be flat after being fixed, and has good appearance and smoothness. In addition, the bonding method is fixed and reliable and the anti-skid pad body 10 is not easy to fall off.

Of course, it cannot be ruled out that in some other embodiments, the anti-skid pad body 10 may also be fixed on the footboard portion 100 in other methods, for example, the anti-skid pad body 10 is fixed on the footboard portion 100 by a pressure bar, or even fixed on the footboard portion 100 by fasteners.

In some embodiments, as shown in FIG. 3, the first surface A of the anti-skid pad body may have a receiving groove C, and the membrane switch may be fixed in the receiving groove C. The membrane switch 20 may be bonded to the anti-skid pad body 10.

Specifically, the receiving groove C on the anti-skid pad body 10 may be injection-molded, so that the membrane switch 20 is firmly fixed, and a surface of the membrane switch 20 facing a groove bottom wall of the receiving groove C may be bonded to the groove bottom wall, and a side wall of the membrane switch 20 may be bonded to a groove side wall of the receiving groove C, so that the membrane switch 20 is fixed to the receiving groove C in multiple directions, thereby maximizing the connection stability of the membrane switch 20. By providing the receiving groove for receiving the membrane switch 20 on the anti-skid pad body 10, the membrane switch 20 may be positioned on the one hand, and the connection stability of the membrane switch 20 may be improved on the other hand, thereby ensuring the functional reliability of the scooter.

Further, a surface of the membrane switch 20 facing a notch of the receiving groove forms a second surface B. A thickness of the membrane switch 20 may be equal to a depth of the receiving groove. As a result, the second surface B may be flush with the first surface A when the membrane switch 20 is fixed in the receiving groove. In this way, the membrane switch 20 and the anti-skid pad body 10 may be fixed to have a smooth appearance, and a thickness of the adhesive layer 40 provided between the membrane switch 20 and the anti-skid pad body 10 with the footboard portion 100 may be uniform everywhere. No faults may occur, thereby ensuring the strength and stability of the connection.

The adhesive layer 40 is provided on both the first surface A and the second surface B, and the adhesive layer 40 is configured to adhesively fix the anti-skid pad body 10 and the membrane switch 20 to the footboard portion 100. Most preferably, the adhesive layer 40 covers the first surface A and the second surface B. The adhesive layer 40 is covered with the anti-skid pad body 10 and the membrane switch 20, which can ensure that the anti-skid pad body 10 and the membrane switch 20 can be firmly fixed on the footboard portion 100 to the greatest extent. Of course, as an optional embodiment, the adhesive layer 40 may be a glue-dispensing type distributed in dots to save manufacturing costs. But obviously, in this glue-dispensing fixing method, after the anti-skid pad body 10 and the membrane switch 20 are fixed, the degree of stability is not high, and individual dispensing points are prone to loosening.

As shown in FIG. 1 and FIG. 2, the membrane switch 20 may have an electrical connection wire 21, and the electrical connection wire 21 is configured to extend into the footboard portion 100 to be electrically connected to an electronic control element 50 inside the footboard portion 100. Further, the electrical connection wire 21 may be arranged at an edge of the membrane switch 20 for ease of processing. The footboard portion 100 may have a through hole 103 into which the electrical connection wire 21 extends, and a shape of the through hole 103 may fit a cross-sectional shape of the electrical connection wire 21. Thereby, the electrical connection wire 21 may act as a positioning member to realize the positioning of the installation position of the membrane switch 20 and the anti-skid pad body 10 on the footboard portion 100.

Some embodiments of the present disclosure also provide a scooter, including a footboard portion 100, a drive wheel is provided under the footboard portion 100, and the footboard anti-skid pad assembly as provided in the first embodiment is installed on the footboard portion. At the same time, a driven wheel may also be provided under the footboard portion 100. When the rear wheel 200 is the drive wheel, the front wheel may be the driven wheel.

The footboard portion 100 may have a receiving space X inside, an electronic control element 50 is accommodated in the receiving space X, the electric drive apparatus is drivingly connected to the drive wheel, and the electronic control element 50 is electrically connected with the membrane switch 20 and the electric drive apparatus respectively. The electric drive apparatus may be a hub motor, which may be used to directly drive the drive wheel to rotate, or the electric drive apparatus is a part of a transmission system, and the rotation of the drive wheel is indirectly controlled by controlling the electric drive apparatus.

To assemble the membrane switch 20, the membrane switch 20 may be first bonded to the first surface A of the anti-skid pad body 10, and then an adhesive is applied to the first surface A of the anti-skid pad body 10 and the second surface B of the membrane switch 20 after bonding, so that the two become a whole. Then, the electrical connection wire 21 on the membrane switch 20 passes through the through hole 103 on the footboard portion 100. The through hole 103 may be located on the upper shell 101. The other end of the electrical connection wire 21 is electrically connected to the electronic control element 50 inside the footboard portion 100. The anti-skid pad body 10 and the membrane switch 20 are integrally bonded to the upper shell 101, then the bonded whole is assembled on the lower shell 102, and the upper shell 101 and the lower shell 102 are detachably connected together by fasteners such as screws.

It should be noted that the structure and function of the footboard anti-skid pad assembly on the scooter are similar to those of the previously described footboard anti-skid pad assembly. For details, reference may be made to the previous description of the footboard anti-skid pad assembly, and detailed description thereof will be omitted.

An embodiment of a first aspect of the present disclosure provides a footboard anti-skid pad assembly configured for being installed on a footboard portion of a scooter, including: an anti-skid pad body, the anti-skid pad body having a first surface for being fixedly connected with the footboard portion; and a membrane switch, fixed on the first surface of the anti-skid pad body, the membrane switch being configured to electrically connect with an electric drive apparatus of the scooter, and the membrane switch being configured to switch on when receiving external force to trigger the electric drive apparatus to start.

In some embodiments, the anti-skid pad body is configured to bond to the footboard portion through an adhesive layer.

In some embodiments, the first surface of the anti-skid pad body has a receiving groove, and the membrane switch is fixed in the receiving groove.

In some embodiments, a thickness of the membrane switch is equal to a depth of the receiving groove.

In some embodiments, a surface of the membrane switch facing a notch of the receiving groove forms a second surface, an adhesive layer is provided on both the first surface and the second surface, and the adhesive layer is configured to adhesively fix the anti-skid pad body and the membrane switch to the footboard portion.

In some embodiments, the adhesive layer covers the first surface and the second surface.

In some embodiments, the membrane switch is bonded to the anti-skid pad body.

In some embodiments, the membrane switch has an electrical connection wire, and the electrical connection wire is configured to extend into the footboard portion to be electrically connected to an electronic control element inside the footboard portion.

In some embodiments, a footboard portion is included, a drive wheel is provided under the footboard portion, and the footboard anti-skid pad assembly as described in any one of the above embodiment is installed on the footboard portion.

In some embodiments, the footboard portion has a receiving space inside, an electronic control element is accommodated in the receiving space, the electric drive apparatus is drivingly connected to the drive wheel, and the electronic control element is electrically connected with the membrane switch and the electric drive apparatus respectively.

In some embodiments, the footboard portion is provided with a through hole, the membrane switch is provided with an electrical connection wire, and the electrical connection wire extends into the footboard portion through the through hole.

In some embodiments, a shape of the through hole fits a cross-sectional shape of the electrical connection wire.

On a non-conflict basis, those skilled in the art may combine the different embodiments or examples and the features of the different embodiments or examples described in this specification.

Finally, it should be noted that the above embodiments are only used to illustrate the technical solution of the present disclosure, rather than limiting the disclosure; although the present disclosure has been described in detail with reference to the foregoing embodiments, those of ordinary skill in the art should understand that: the technical solution recorded in the foregoing embodiments can still be modified, or some of the technical features can be equivalently replaced; these modifications or replacements do not cause the essence of the corresponding technical solution to deviate from the spirit and scope of the technical solution of the embodiments of the present disclosure.

What is claimed is:

1. A footboard anti-skid pad assembly configured for being installed on a footboard portion of a scooter, comprising:
   an anti-skid pad body, the anti-skid pad body having a first surface for being fixedly connected with the footboard portion; and
   a membrane switch, fixed on the first surface of the anti-skid pad body, the membrane switch being configured to electrically connect with an electric drive apparatus of the scooter, and the membrane switch being configured to switch on when receiving external force to trigger the electric drive apparatus to start;
   wherein the first surface of the anti-skid pad body has a receiving groove, and the membrane switch is fixed in the receiving groove.

2. The footboard anti-skid pad assembly according to claim 1, wherein the anti-skid pad body is configured to bond to the footboard portion through an adhesive layer.

3. The footboard anti-skid pad assembly according to claim 1, wherein a thickness of the membrane switch is equal to a depth of the receiving groove.

4. The footboard anti-skid pad assembly according to claim 3, wherein a surface of the membrane switch facing a notch of the receiving groove forms a second surface, an adhesive layer is provided on both the first surface and second surface, and the adhesive layer is configured to adhesively fix the anti-skid pad body and the membrane switch to footboard portion.

5. The footboard anti-skid pad assembly according to claim 4, wherein the adhesive layer covers the first surface and the second surface.

6. The footboard anti-skid pad assembly according to claim 1, wherein the membrane switch is bonded to the anti-skid pad body.

7. The footboard anti-skid pad assembly according to claim 1, wherein the membrane switch has an electrical connection wire, and the electrical connection wire is configured to extend into the footboard portion to be electrically connected to an electronic control element inside the footboard portion.

8. A scooter, comprising a footboard portion, a drive wheel provided under the footboard portion, and a footboard anti-skid pad assembly installed on the footboard portion, the footboard anti-skid pad assembly comprising:
   an anti-skid pad body, the anti-skid pad body having a first surface for being fixedly connected with the footboard portion; and a membrane switch, fixed on the first surface of the anti-skid pad body, the membrane switch being configured to electrically connect with an electric drive apparatus of the scooter, and the membrane switch being configured to switch on when receiving external force to trigger the electric drive apparatus to start;

wherein the first surface of the anti-skid pad body has a receiving groove, and the membrane switch is fixed in the receiving groove.

9. The scooter according to claim 8, wherein the anti-skid pad body is configured to bond to the footboard portion through an adhesive layer.

10. The scooter according to claim 8, wherein a thickness of the membrane switch is equal to a depth of the receiving groove.

11. The scooter according to claim 10, wherein a surface of the membrane switch facing a notch of the receiving groove forms a second surface, an adhesive layer is provided on both the first surface and the second surface, and the adhesive layer is configured to adhesively fix the anti-skid pad body and the membrane switch to footboard portion.

12. The scooter according to claim 11, wherein the adhesive layer covers the first surface and the second surface.

13. The scooter according to claim 8, wherein the membrane switch is bonded to the anti-skid pad body.

14. The scooter according to claim 8, wherein the membrane switch has an electrical connection wire, and the electrical connection wire is configured to extend into the footboard portion to be electrically connected to an electronic control element inside the footboard portion.

15. The scooter according to claim 8, wherein the footboard portion has a receiving space inside, an electronic control element is accommodated in the receiving space, the electric drive apparatus is drivingly connected to the drive wheel, and the electronic control element is electrically connected with the membrane switch and the electric drive apparatus.

16. The scooter according to claim 8, wherein the footboard portion is provided with a through hole, the membrane switch is provided with an electrical connection wire, and the electrical connection wire extends into the footboard portion through the through hole.

17. The scooter according to claim 16, wherein a shape of the through hole fits a cross-sectional shape of the electrical connection wire.

* * * * *